Patented Nov. 25, 1941

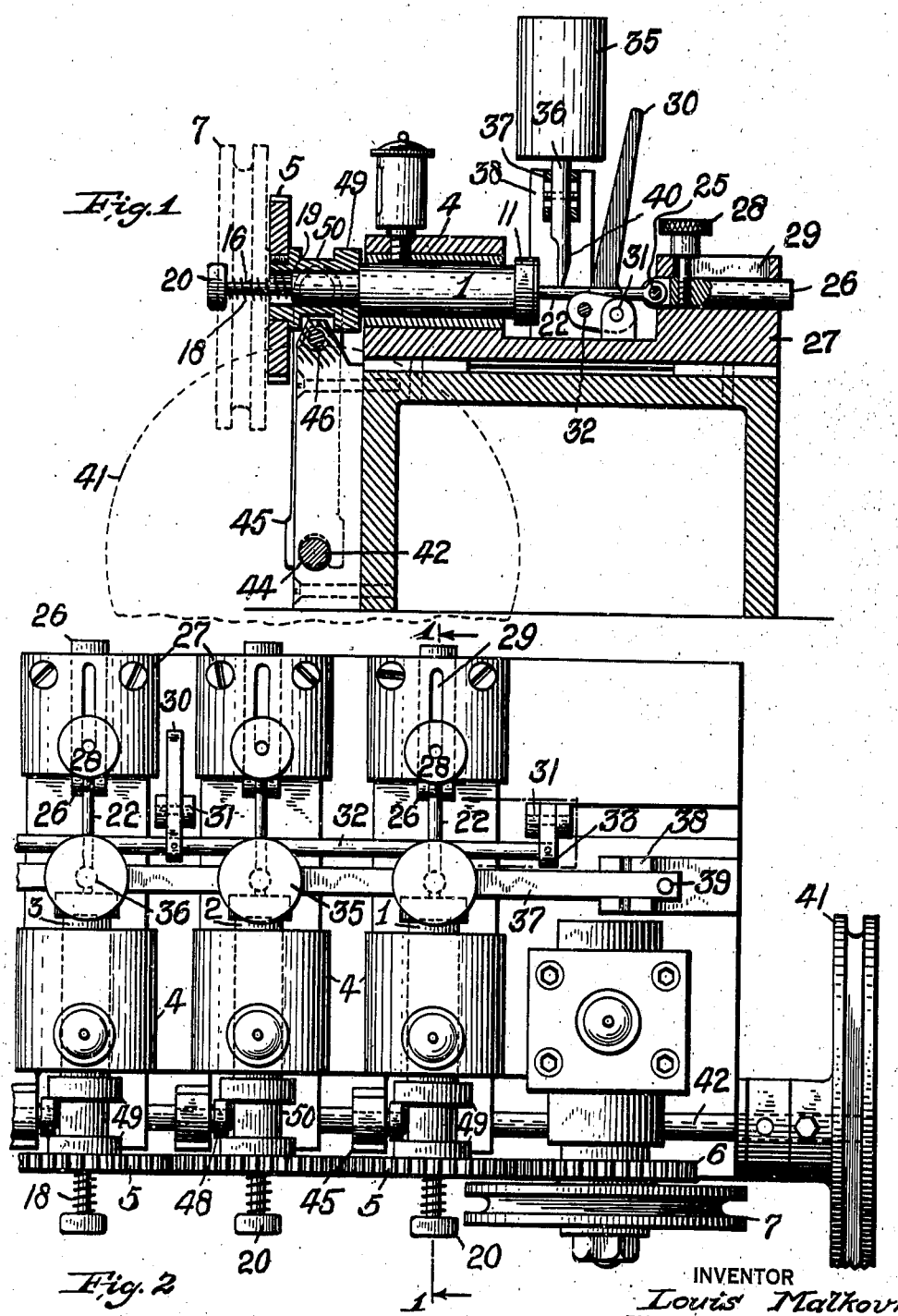

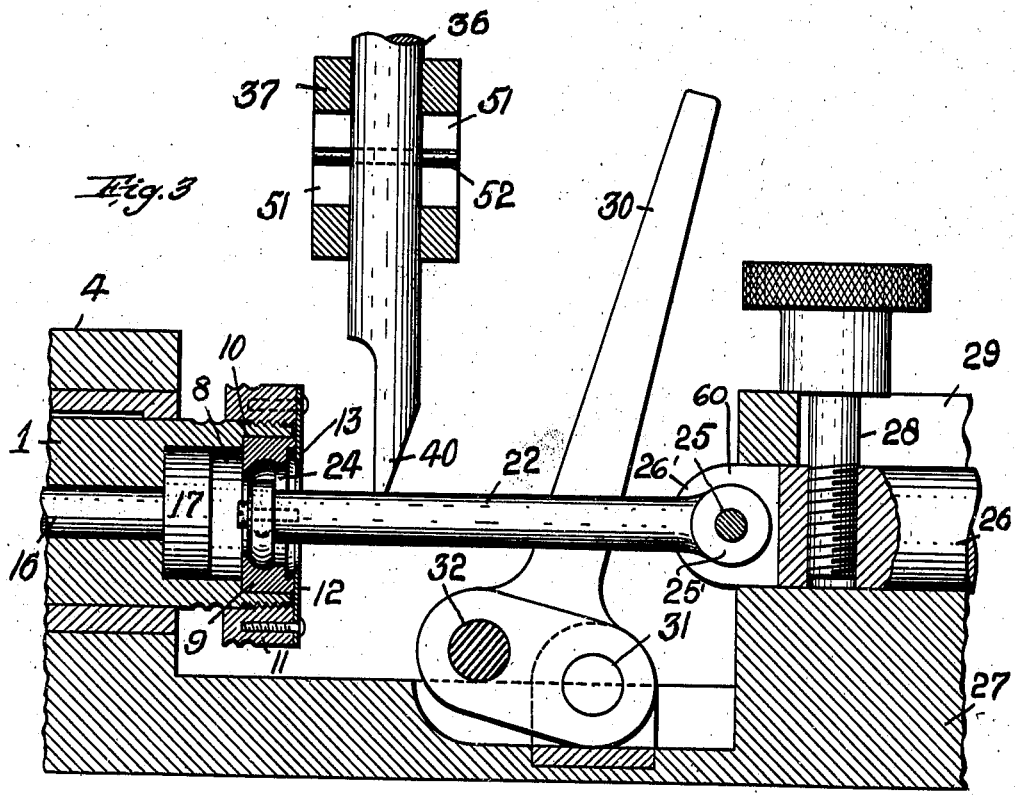
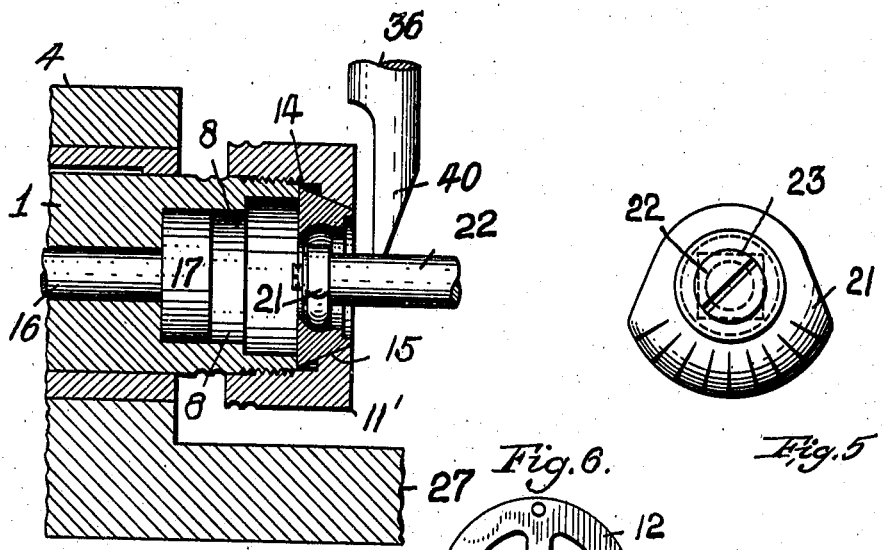

2,263,927

UNITED STATES PATENT OFFICE 2,263,927

LAPPING MACHINE

Louis Malkovsky, Floral Park, N. Y., assignor to Sperry Gyroscope Company, Inc., Brooklyn, N. Y., a corporation of New York Application November 30, 1939, Serial No. 306,777

9 Claims. (Cl. 51—157)

This invention relates to the finishing of the races of ball bearings for use in very sensitive instruments, such as small gyroscopic instruments. For such uses the accuracy of the ordinary commercial ball race is insufficient, and the following invention relates to a machine for truing up ball races and polishing the same so as to fit them for use in the class of instruments referred to. With the hand methods of lapping and polishing employed prior to my invention, one-half to two-thirds of the bearings tested were commonly rejected, but with my improved lapping and polishing machine, nearly all of the bearings can be rendered sufficiently accurate to be utilized in the manufacture of sensitive and scientific instruments. It will be obvious from the following description that my invention also has application to all bearings of the ball or rolling type and especially to those in which the races are curved in more than one plane.

Referring to the drawings,

Fig. 1 is a vertical section of my lapping and polishing machine taken approximately on line 1—1 of Fig. 2.

Fig. 2 is a plan view of the same.

Fig. 3 is an enlarged vertical section of the upper central portion of the machine shown in Fig. 1.

Fig. 4 is a similar detail view showing a modified form of chuck or work holder on the machine.

Fig. 5 is an enlarged front view of the lapping tool employed.

Fig. 6 is a face view of the spring plate forming part of the chuck.

My machine is designed to lap a number of similar bearings simultaneously and is therefore provided with a series of rotary spindles 1, 2, 3, etc., each of which is journaled in a head 4 and is rotated by a gear 5, which gears intermesh with each other and with a drive gear 6 on the shaft of the drive pulley 7. Each shaft is preferably rotated at the same speed. Each shaft is also made hollow at its forward end 8 to receive the ball race 9 of one of the bearings. The race is pressed inwardly so that it engages the shoulder 10 on the interior of the shaft and is held in place by a cap 11 threaded on the end of the shaft and having a spring plate 12 riveted to the front thereof, the inner portion of which engages the outer portion of the ball race 9 and yieldingly holds the same in place. If desired, the spring plate 12 may have cut away portions to form spring fingers 13 (Fig. 6). If the ball race is of a different form, for instance cone shaped as shown in Fig. 4, the clamping nut 11' may be made with a tapered interior 15 to be brought up against the tapered exterior 14 of the race as it is threaded on the shaft 1.

After the lapping operation is completed, the cap 11 or 11' is removed and a small shaft 16 slidably mounted in the spindle 1 is pushed forwardly to bring the collar 17 on the end thereof against the ball race and eject the same. The shaft 16 is normally held rearwardly by the collar in the position shown in the figures by means of a spring 18 bearing at one end against the outer reduced end 19 of the spindle 1 and at its other end against the knob 20, by means of which the shaft 16 is manipulated.

The lapping tool itself is shown as a small segment 21 of soft material, such as lead, which is clamped on the end of a shaft 22 as by means of set screw 23. A substantial arc or segment 21 at the lower portion of the tool is curved about the center of the shaft 22 and is cleft to hold the lapping compound, but the upper portion is cut away so that it does not contact with the bearing. The radius of curvature of the segment 21 is also made substantially the same as the radius of curvature of the bearing race, and it is also curved in an axial direction to substantially fit the race; i. e., of the same or slightly less radius of curvature than the corresponding radius of curvature of the race in an axial direction. With the lapping tool in place, as shown in Figs. 3 and 4, it rests on the bottom of the race and contacts the same over an angle of some 120°.

Obviously, the lapping tool could not be inserted or withdrawn in this position, since the outer portion 24 of the bearing is of less diameter than its central portion. In order to insert and withdraw the lapping tool, the shaft 22 on which it is mounted, is hinged, as at 25, on a spindle 26 slidably mounted in the base 27, but which spindle may be clamped in any position by tightening the clamp screw 28 which passes through a slot 29 in the base plate 27, and hence holds the same both against turning and axial displacement. Except for its pivotal mounting about the horizontal axis of pivot pin 25, tool holder 22 is thereby held substantially rigid or fixed in all other directions, the flattened sides of its hub 25' being guided between the inner surfaces 60 of the bifurcated end 26' of spindle 26. All the shafts 22 may be raised simultaneously by means of the T-shaped lever 30 pivoted at 31 on the base plate and carrying the long shaft 32 extending throughout the length of the machine and carried in hinged gears 33 at each end.

When the lever 30 is rotated rearwardly, the shaft 32 is brought up under the shafts 22 and raises the same slightly, whereupon, after loosening the clamp screws 28, each lapping tool may be withdrawn from the bearings.

In order to hold the lapping tools firmly in place while operating, I have shown a series of weights 35, each having a downwardly projecting shaft 36 passing loosely through a common supporting bar 37. Limited movement is provided by vertical slots 51 through said bar acting as guides and limit stops for cross pins 52 in said shafts 36. Bar 37 is guided at both ends in a vertical slot in a bracket 38. The foot 40 of each shaft or leg 36 normally rests on one of the shafts 22 to exert pressure on the lapping tool 21. By grasping the handle 39, the operator may lift the entire series of weights off the machine to relieve the spindles 22 of pressure so that they may be withdrawn from the bearings. When starting up the machine, the spindles in the raised position are inserted in the bearings, the lever 30 then moved to the left in Fig. 3 to lower the same, and the bar 38 with its masses 35 then placed in position to cause the feet 40 thereof to rest on each shaft 22.

In addition to rotating the bearings, I prefer to also give the same a slight endwise oscillation or reciprocating motion which preferably should not be in phase with the rotary motion. To secure this purpose, I have shown a second pulley 41 mounted on one end of a long shaft 42 passing the length of the machine. Said shaft is provided with a series of slightly eccentric cams 44, around each of which extends the forked lower end of a lever 45 pivoted on the base plate at 46. Said lever has extending from its upper portion a ball bearing member 48 normally resting between collars 49 on a sleeve 50 splined on the reduced end 19 of spindle 1 and shown as also secured to the gear 5. Therefore, as the shaft 42 rotates, the spindle 1 will be reciprocated through a small distance so as to lap the entire surface of the bearings.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A lapping machine as claimed in claim 7, in which a removable mass normally rests on said tool to hold its cutting surface in contact with the bearing race, whereby a constant predetermined pressure is exerted on the tool.

2. In a lapping machine for the races of ball bearings and the like, a work holder, means for continuously rotating the same, means for reciprocating the same through a small distance, a lapping tool, means for pivotally mounting said tool to permit insertion in and withdrawal from the work, a mass normally resting thereon to cause operating engagement with the work at constant predetermined pressure, and means for raising said mass and lifting said tool for withdrawal of the same.

3. In a lapping machine for the races of ball bearings, a work holder, means for continuously rotating the same, means for reciprocating the same through a small distance out of phase with its rotation, a lapping tool, a substantial portion of the surface of which is circumferentially and axially curved to conform to the desired inner curvature of the race, and means for yieldingly pressing said tool into engagement with the inner curved surface of the race at constant predetermined pressure.

4. In a lapping machine for the races of ball bearings and the like, a plurality of spindles, means for rotating each, means for reciprocating each through a small distance as it rotates, a work holder at the forward end of each spindle, a plurality of pivoted lapping tools, each adapted to enter a race and to make contact with a substantial area of the inner surface thereof, and a common means for raising and lowering the same to permit insertion of the tools into the work and withdrawal therefrom.

5. In a lapping machine for the races of roll type bearings, a chuck adapted to receive a race, means on the chuck for centering and clamping the race, means for rotating the chuck about its axis, a lapping tool having its working surface circumferentially curved to substantially the same radius as and extending over a substantial area of the major curvature of said race and also curved axially to substantially the same radius as the corresponding radius of curvature of said race whereby the tool fits a substantial area of the race, and means for relatively reciprocating said chuck and tool through a small distance as the chuck rotates while fixing said tool against rotation.

6. In a lapping machine for the races of ball bearings and the like, a work holder, means for continuously rotating the same, means for reciprocating the same through a small distance, a lapping tool, means supporting said tool for up and down movement, means for adjusting said tool toward and away from the work, and a movable mass adapted to rest on said tool when in operation to exert a uniform predetermined pressure thereon.

7. In a precision lapping machine for the races of ball bearings and the like, a work holder, a lapping tool having an annular working surface of substantial length curved in two planes, means for fixedly mounting said tool against rotation with one center of curvature concentric with the center of curvature of the bearing, means for causing rotation and reciprocation of said holder through a small distance, said tool mounting means including a pivoted arm on which said tool is mounted, permitting shifting of said center of said tool for inserting the tool in and removing it from the bearing.

8. In a precision lapping machine for the races of ball bearings and the like, a work holder, means for continuously rotating the same, means for reciprocating the same through a small distance, a lapping tool, means for pivotally mounting said tool about a horizontal axis to permit insertion in and withdrawal from the work, said mounting holding said tool against lateral displacement, locking means for holding said mounting against sliding motion and rotation, and means including a mass resting on said tool for maintaining said tool in operative engagement with said work at constant predetermined pressure.

9. A precision lapping machine as claimed in claim 8 further including means for raising said mass away from said tool and lifting said tool for withdrawal of the same.

LOUIS MALKOVSKY.